United States Patent
Shen et al.

(10) Patent No.: US 12,554,577 B2
(45) Date of Patent: Feb. 17, 2026

(54) STORAGE APPARATUS, STORAGE CONTROL APPARATUS, AND SYSTEM ON CHIP

(71) Applicant: Huawei Technologies Co., Ltd., Shenzhen (CN)

(72) Inventors: Guoming Shen, Dongguan (CN); Zhengbo Wang, Shenzhen (CN); Xuewen Yi, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 69 days.

(21) Appl. No.: 18/331,635

(22) Filed: Jun. 8, 2023

(65) Prior Publication Data

US 2023/0315566 A1  Oct. 5, 2023

Related U.S. Application Data

(63) Continuation of application No. PCT/CN2020/134604, filed on Dec. 8, 2020.

(51) Int. Cl.
*G06F 11/00* (2006.01)
*G06F 11/10* (2006.01)

(52) U.S. Cl.
CPC ...... *G06F 11/1044* (2013.01); *G06F 11/1048* (2013.01)

(58) Field of Classification Search
CPC .......................... G06F 11/1044; G06F 11/1048
See application file for complete search history.

(56) References Cited

U.S. PATENT DOCUMENTS

| | | | | |
|---|---|---|---|---|
| 5,958,079 A | * | 9/1999 | Yoshimura | G06F 11/1048 714/E11.049 |
| 9,189,329 B1 | * | 11/2015 | Zhu | G06F 11/1048 |
| 2008/0077840 A1 | * | 3/2008 | Shaw | G06F 11/1048 714/E11.049 |
| 2019/0050316 A1 | | 2/2019 | Kim et al. | |
| 2019/0258538 A1 | * | 8/2019 | Byun | G11C 7/10 |
| 2021/0311827 A1 | * | 10/2021 | Lu | G06F 3/0619 |
| 2021/0374001 A1 | * | 12/2021 | Kim | G06F 11/1048 |

FOREIGN PATENT DOCUMENTS

CN  101606131 A  12/2009

OTHER PUBLICATIONS

Luo, Yixin et al., Using ECC DRAM to Adaptively Increase Memory Capacity, 2017, arXiv (Year: 2017).*

* cited by examiner

*Primary Examiner* — Marc Duncan
(74) *Attorney, Agent, or Firm* — Conley Rose, P.C.

(57) ABSTRACT

A storage apparatus includes a first memory disposed in a first die and configured to store data, a second memory disposed in a second die and configured to store an error correcting code corresponding to the data. The error correcting code may be used to perform data protection on the data. A storage controller is configured to write the data into the first memory, and read the data from the first memory.

20 Claims, 10 Drawing Sheets

| DRAM zone | Whether ECC is required | SRAM zone |
|---|---|---|
| channel0+bank0 | no | no |
| channel0+bank1 | yes | zone0 |
| ... | no | no |
| channel0+bank62 | no | no |
| channel0+bank63 | yes | zone1 |
| channel1+bank0 | no | no |
| channel1+bank1 | ... | ... |
| ... | no | no |
| channel1+bank62 | yes | zone2 |
| channel1+bank63 | no | no |
| ... | yes | zone5 |
| ... | no | no |
| channel7+bank62 | no | no |
| channel7+bank63 | yes | zone7 |

| SRAM zone |
|---|
| zone0 |
| zone1 |
| zone2 |
| zone3 |
| zone4 |
| zone5 |
| zone6 |
| zone7 |

STORAGE APPARATUS, STORAGE CONTROL APPARATUS, AND SYSTEM ON CHIP

CROSS-REFERENCE TO RELATED APPLICATIONS

This is a continuation of International Patent Application No. PCT/CN2020/134604, filed on Dec. 8, 2020, the disclosure of which is hereby incorporated by reference in its entirety.

TECHNICAL FIELD

This disclosure relates to the storage field, and in particular, to a storage apparatus, a storage control apparatus, and a system on chip.

BACKGROUND

With development of science and technology, a scale of a dynamic random-access memory (DRAM) chip is increasingly large, and a working frequency is increasingly high. When the DRAM chip is in a working state, local soft errors of varying degrees may occur. To avoid a data read/write error caused by a soft error, an error checking and correcting technology is used in the DRAM chip to protect data on which the soft error occurs.

Currently, in a DRAM data protection technology, independent error correcting code (ECC) partitions are usually configured in the DRAM chip, and ECC partitions are usually evenly deployed near DRAM partitions. However, because the ECC partitions occupy storage space of the DRAM chip, a capacity of available data in the DRAM chip is small.

SUMMARY

This disclosure provides a storage apparatus, a storage control apparatus, and a system on chip, to prevent an error correcting code from occupying storage space in a first memory, and improve a capacity of available data in the first memory.

According to a first aspect, a storage apparatus includes a first memory, configured to store data, a second memory, configured to store an error correcting code corresponding to the data, where the error correcting code is used to perform data protection on the data, and a storage controller, configured to write the data into the first memory, and read the data from the first memory. The first memory and the second memory are disposed in different dies.

The storage controller and the first memory are coupled through an address line and data lines (including a write data line and a read data line). The storage controller may be configured to: write first data into the first memory through the address line and the write data line, or read second data from the first memory through the address line and the read data line.

For example, the first memory may be a DRAM. The first memory may include one or more DRAM dies, for example, a plurality of 3-dimensional (3D) stacked DRAM dies. Optionally, the first memory may alternatively be a memory such as a 3D stacked static random-access memory (SRAM) or a nonvolatile memory (NVM).

For example, the second memory may be an SRAM. The second memory may include one or more SRAM dies.

In this disclosure, the first memory and the second memory are integrated into different dies, and the error correcting code is stored in the second memory. That is, a storage area of the error correcting code is centralized in the second memory outside the first memory. In this way, the error correcting code does not occupy storage space in the first memory, and a capacity of available data in the first memory is improved. For example, in a DRAM scenario, the error correcting code is stored in the second memory (for example, the SRAM), and the second memory and the first memory (for example, the DRAM) are disposed in different dies. A storage area in the DRAM die does not need to be allocated to the error correcting code, to prevent the error correcting code from occupying storage space in the DRAM die, and increase a capacity of available data in the DRAM die.

Further, in some technology, an error correcting code partition and a data partition are disposed in a same die, and the error correcting code can be used for only data protection on data on the same die. However, in this disclosure, a data partition is disposed in the first memory, an error correcting code partition is disposed in the second memory, and the second memory and the first memory are disposed in different dies. In this way, the error correcting code in the second memory can be used for data protection on data in one or more first memories, so that a plurality of first memories share one second memory. It may be alternatively understood that the error correcting code is globally shared.

In addition, in some technology, a soft error of the first memory is related to an actual application scenario, and it is impossible to predict a data partition that has a high probability of soft error. Therefore, error correcting code partitions need to be configured for all data partitions. However, in this way, for a data partition in which no soft error occurs or in a scenario in which a data soft error is insensitive (with strong fault tolerance), it is a waste to configure error correcting code partitions for all data partitions. However, in this disclosure, because the data partition is disposed in the first memory, the error correcting code partition is disposed in the second memory, and the second memory and the first memory are disposed in different dies, a zone in the second memory can be flexibly allocated to a zone that actually requires data protection in the first memory, and not all data partitions are allocated with error correcting code partitions. In this way, error correcting code storage resources can be saved, an area in which data protection is performed can be flexibly adjusted based on an actual requirement and a working state, and utilization of error correcting code storage resources is improved.

In some possible implementations, the data includes the first data and the second data, and the storage apparatus further includes an error checking and correcting (error checking and correction, ECC) circuit, configured to: generate a first error correcting code corresponding to the first data, and perform error correction on the second data based on a second error correcting code in the second memory, where the second error correcting code is an error correcting code corresponding to the second data. The storage controller is further configured to: write the first data into the first memory, and read the second data from the first memory.

In some possible implementations, the ECC circuit is further configured to: when determining that the first data is data that needs to be protected, generate the first error correcting code; and when determining that the second data is data that needs to be protected, perform error correction on the second data based on the second error correcting code.

In some possible implementations, the ECC circuit is further configured to: when determining that the first data is data that does not need to be protected, write the first data into a first zone based on a first address.

In some possible implementations, the ECC circuit is further configured to: when determining that the second data is data that does not need to be protected, output the second data to the storage controller based on a second address.

In this disclosure, when determining that the first data and the second data are data that needs to be protected, the ECC circuit performs an ECC operation (for example, generating an error correcting code) on the first data and the second data. In this way, an ECC operation is selectively performed on data, and utilization of error correcting code storage resources is improved while effective data protection is ensured.

In some possible implementations, the ECC circuit is configured to: determine, based on the first address corresponding to the first data and preset protection configuration information, whether the first data is data that needs to be protected, and determine, based on the protection configuration information and the second address corresponding to the second data, whether the second data is data that needs to be protected. The protection configuration information includes a mapping relationship between an address of a zone in the first memory and an address of a zone in the second memory, and the zone in the second memory corresponds to data that needs to be protected.

In this disclosure, configurable protection configuration information may be set, and the mapping relationship between a zone in the first memory and a zone in the second memory is changed by configuring the protection configuration information, so that a zone in the second memory can be flexibly allocated to a zone that needs to be protected in the first memory, and does not need to fixedly correspond to all zones in the data partition. In this way, for a data partition with small access traffic, a corresponding error correcting code storage resource may not be configured, to save error correcting code storage resources, so as to adjust, based on an actual requirement and a working state, an area in which data protection is performed, and improve utilization of error correcting code storage resources.

In some possible implementations, the storage controller is configured to output the first address and the first data to the ECC circuit. The ECC circuit is further configured to: write the first error correcting code into the second memory, and write the first data into the first zone in the first memory based on the first address.

In some possible implementations, the ECC circuit is further configured to: when determining that the first data is data that needs to be protected, obtain a third address corresponding to the first address, and write the first error correcting code into a second zone in the second memory based on the third address, to protect the first data.

In some possible implementations, the ECC circuit is further configured to: when determining that the second data is data that needs to be protected, obtain a fourth address corresponding to the second address, and read the second error correcting code from a fourth zone in the second memory based on the fourth address, to protect the second data.

In some possible implementations, the storage controller is further configured to output the second address to the ECC circuit. The ECC circuit is further configured to: read second data from a third zone in the first memory based on the second address, and output the second data to the storage controller.

In some possible implementations, the ECC circuit is configured to: check the second data based on the second error correcting code; and if an error is detected, perform error correction on the second data, and output the error-corrected second data to the storage controller; or if no error is detected, output the second data to the storage controller.

In this disclosure, when determining that the first data and the second data are data that needs to be protected, the ECC circuit performs an ECC operation (for example, performing error correction based on an error correcting code) on the first data and the second data. In this way, an ECC operation is selectively performed on data, and utilization of error correcting code storage resources is improved while effective data protection is ensured.

In some possible implementations, the ECC circuit is configured to: when determining that the second data is data that does not need to be protected, output the second data to the storage controller.

In some possible implementations, the ECC circuit and the second memory are disposed in a same die; or the ECC circuit and the second memory are disposed in different dies.

In some possible implementations, the ECC circuit and the storage controller are disposed in different dies; or the ECC circuit and the storage controller are disposed in a same die.

In some possible implementations, a low end address of each zone in the first memory is the same as a storage address of each zone in the second memory.

According to a second aspect, this disclosure provides a storage control apparatus that may include a storage controller and an ECC circuit. The storage controller is configured to: write first data into a first memory, and read second data from the first memory. The ECC circuit is configured to: when determining that the first data is data that needs to be protected, generate a first error correcting code; and when determining that the second data is data that needs to be protected, perform error correction on the second data based on a second error correcting code.

In this disclosure, when determining that the first data and the second data are data that needs to be protected, the ECC circuit performs an ECC operation (for example, generating an error correcting code, and performing error correction based on an error correcting code) on the first data and the second data. In this way, an ECC operation is selectively performed on data, and utilization of error correcting code storage resources is improved while effective data protection is ensured.

In some possible implementations, the ECC circuit is configured to: determine, based on preset protection configuration information and a first address corresponding to the first data, whether the first data is data that needs to be protected, and determine, based on the protection configuration information and a second address corresponding to the second data, whether the second data is data that needs to be protected. The protection configuration information includes a mapping relationship between an address of a zone in the first memory and an address of a zone in a second memory, and the zone in the second memory corresponds to data that needs to be protected.

In some possible implementations, the storage controller is configured to output the first address and the first data to the ECC circuit. The ECC circuit is further configured to: write the first error correcting code into the second memory, and write the first data into a first zone in the first memory based on the first address.

In some possible implementations, the ECC circuit is further configured to: when determining that the first data is data that needs to be protected, obtain a third address corresponding to the first address, and write the first error correcting code into a second zone in the second memory based on the third address.

In some possible implementations, the ECC circuit is further configured to: when determining that the first data is data that does not need to be protected, write the first data into the first zone based on the first address.

In some possible implementations, the storage controller is further configured to output the second address to the ECC circuit. The ECC circuit is further configured to: read the second data from a third zone in the first memory based on the second address, and output the second data to the storage controller.

In some possible implementations, the ECC circuit is configured to: check the second data based on the second error correcting code; and if an error is detected, perform error correction on the second data, and output the error-corrected second data to the storage controller; or if no error is detected, output the second data to the storage controller.

In some possible implementations, the ECC circuit is further configured to: when determining that the second data is data that needs to be protected, obtain a fourth address corresponding to the second address, and read the second error correcting code from a fourth zone in the second memory based on the fourth address.

In some possible implementations, the ECC circuit is configured to: when determining that the second data is data that does not need to be protected, output the second data to the storage controller.

In some possible implementations, the ECC circuit and the second memory are disposed in a same die; or the ECC circuit and the second memory are disposed in different dies.

In some possible implementations, the ECC circuit and the storage controller are disposed in different dies; or the ECC circuit and the storage controller are disposed in a same die.

According to a third aspect, this disclosure provides a system on chip, including a processor, a bus, and the storage apparatus according to any one of the first aspect and the possible implementations of the first aspect.

The processor is configured to: output a write instruction and first data to the storage apparatus through the bus; or output a read instruction to the storage apparatus through the bus, and receive, through the bus, second data output by the storage apparatus. The write instruction instructs to write the first data into a first storage area, and the read instruction instructs to read the second data from a second storage area.

According to a fourth aspect, this disclosure provides a data storage method, which may be applied to a storage apparatus according to any one of the first aspect and the possible implementations of the first aspect. The method may include: A storage controller writes data into a first memory, and reads the data from the first memory. The first memory and a second memory are disposed in different dies, the second memory is configured to store an error correcting code corresponding to the data, and the error correcting code is used to perform data protection on the data.

In some possible implementations, the data includes first data and second data. That the storage controller writes data into a first memory includes: The storage controller writes the first data into the first memory.

That the storage controller reads the data from the first memory includes: The storage controller reads the second data from the first memory.

Correspondingly, the method further includes: The ECC circuit generates a first error correcting code corresponding to the first data; or the ECC circuit performs error correction on the second data based on a second error correcting code in the second memory, where the second error correcting code is an error correcting code corresponding to the second data.

In some possible implementations, that the ECC circuit generates a first error correcting code corresponding to the first data includes: When determining that the first data is data that needs to be protected, the ECC circuit generates the first error correcting code.

That the ECC circuit performs error correction on the second data based on a second error correcting code in the second memory includes: When determining that the second data is data that needs to be protected, the ECC circuit performs error correction on the second data based on the second error correcting code.

In some possible implementations, the method further includes: The ECC circuit determines, based on preset protection configuration information and a first address corresponding to the first data, whether the first data is data that needs to be protected; or the ECC circuit determines, based on the protection configuration information and a second address corresponding to the second data, whether the second data is data that needs to be protected. The protection configuration information includes a mapping relationship between an address of a zone in the first memory and an address of a zone in a second memory, and the zone in the second memory corresponds to data that needs to be protected.

In some possible implementations, that the storage controller writes first data into a first memory includes: The storage controller outputs the first address and the first data to the ECC circuit. The ECC circuit writes the first data into a first zone in the first memory based on the first address.

In some possible implementations, after the ECC circuit generates the first error correcting code, the method further includes: The ECC circuit obtains a third address corresponding to the first address, and writes the first error correcting code into a second zone in the second memory based on the third address.

In some possible implementations, the method further includes: When determining that the first data is data that does not need to be protected, the ECC circuit writes the first data into the first memory.

In some possible implementations, that the storage controller reads second data from the first memory includes: The storage controller outputs the second address to the ECC circuit. The ECC circuit reads the second data from a third zone in the first memory based on the second address. The ECC circuit outputs the second data to the storage controller.

In some possible implementations, that the ECC circuit outputs the second data to the storage controller includes: The ECC circuit checks the second data based on the second error correcting code; and if an error is detected, performs error correction on the second data, and outputs the error-corrected second data to the storage controller; or if no error is detected, outputs the second data to the storage controller.

In some possible implementations, when it is determined that the second data is data that needs to be protected, the method further includes: The ECC circuit obtains a fourth address corresponding to the second address; and reads the second error correcting code from a fourth zone in the second memory based on the fourth address.

In some possible implementations, the method further includes: When determining that the second data is data that does not need to be protected, the ECC circuit outputs the second data to the storage controller.

According to a fifth aspect, this disclosure provides a data storage method, which may be applied to a storage control apparatus according to any one of the second aspect and the possible implementations of the second aspect. The method may include:

The storage control apparatus writes first data into a first memory, and reads second data from the first memory.

When determining that the first data is data that needs to be protected, the storage control apparatus generates a first error correcting code.

When determining that the second data is data that needs to be protected, the storage control apparatus performs error correction on the second data based on a second error correcting code.

In some possible implementations, the method further includes: The storage control apparatus determines, based on preset protection configuration information and a first address corresponding to the first data, whether the first data is data that needs to be protected.

The storage control apparatus determines, based on the protection configuration information and the second address corresponding to the second data, whether the second data is data that needs to be protected.

The protection configuration information includes a mapping relationship between an address of a zone in the first memory and an address of a zone in the second memory, and the zone in the second memory corresponds to data that needs to be protected.

In some possible implementations, that the storage control apparatus writes first data into a first memory includes: The storage control apparatus writes the first data into a first zone in the first memory based on the first address.

In some possible implementations, after the storage control apparatus generates the first error correcting code, the method further includes: The storage control apparatus obtains a third address corresponding to the first address, and writes the first error correcting code into a second zone in the second memory based on the third address.

In some possible implementations, the method further includes: When determining that the first data is data that does not need to be protected, the storage control apparatus writes the first data into the first memory.

In some possible implementations, that the storage control apparatus reads the second data from the first memory includes: The storage control apparatus reads the second data from a third zone in the first memory based on the second address.

In some possible implementations, that the storage control apparatus reads the second data from the first memory includes: The storage control apparatus checks the second data based on the second error correcting code; and if an error is detected, the storage control apparatus performs error correction on the second data, and obtains the error-corrected second data; or if no error is detected, the storage control apparatus obtains the second data.

In some possible implementations, before the storage control apparatus performs error correction on the second data, the method further includes: When determining that the second data is data that needs to be protected, the storage control apparatus obtains a fourth address corresponding to the second address; and the storage control apparatus reads the second error correcting code from a fourth zone in the second memory based on the fourth address.

In some possible implementations, the method further includes: When determining that the second data is data that does not need to be protected, the storage control apparatus reads the second data.

According to a sixth aspect, this disclosure provides an electronic device. The electronic device includes a processor, a bus, and the storage apparatus according to any one of the first aspect and the possible implementations of the first aspect. The processor is coupled to the storage apparatus through the bus.

In some possible implementations, the processor may include the system on chip according to the third aspect.

In some possible implementations, the storage apparatus is further configured to store program instructions. The processor is configured to: when the electronic device runs, execute the program instructions stored in the storage apparatus, so that the electronic device implements a corresponding function.

In some possible implementations, the electronic device further includes an input device and an output device. The input device is configured to input a command and information to the electronic device, and the input device is connected to the processor through the bus. The output device is used by the electronic device to output information, and the output device may also be connected to the processor through the bus.

In some possible implementations, the electronic device further includes an antenna system. The antenna system receives and sends a wireless communication signal under control of the processor, to implement wireless communication with a mobile communication network.

It can be understood that the technical solutions in the second aspect to the sixth aspect of this disclosure are consistent with the technical solution in the first aspect of this disclosure. Advantageous effects achieved in the aspects and the corresponding feasible implementations are similar, and details are not described again.

DESCRIPTION OF EMBODIMENTS

The following describes embodiments of this disclosure with reference to the accompanying drawings in embodiments. In the following descriptions, reference is made to the accompanying drawings that form a part of this disclosure and show aspects of embodiments in an illustrative manner or in which aspects of embodiments may be used.

A DRAM is a type of semiconductor memory with a large capacity and high density. As a scale of a DRAM chip is increasingly large, a working frequency is increasingly high. When the DRAM chip is in a working state, due to electromagnetic interference and the like inside an electronic device, a cell in the DRAM chip automatically changes to an opposite state (in this case, a data soft error occurs). Such a cell error may be implicit, that is, does not cause serious impact on data. However, banks in the DRAM chip are associated with each other. Therefore, the cell error may cause a data read/write error, and may further affect the entire electronic device. Therefore, to avoid the data read/write error caused by the cell error, an ECC technology is usually used in the DRAM chip for error correction data on which a soft error occurs.

The ECC technology is a data protection method, and a main function is to find and correct an error. In the ECC technology, an additional partition is required to store an error correcting code, but a quantity of bits occupied by the error correcting code is not in a linear relationship with a data length. The ECC technology uses 8-bit data and 5-bit error correcting code as references, and only one bit needs to be added in the error correcting code for each piece of additional 8-bit data. For example, an error correcting code generated for 8-bit data needs to occupy 5-bit space. For an error correcting code corresponding to 16-bit data, one bit needs to be added to the space occupied by the error correcting code corresponding to the 8-bit data, that is, 6 bits. For 32-bit data, one bit needs to be added to the space occupied by the error correcting code corresponding to 16-bit data, that is, a 7-bit error correcting code, and so on. An error correcting code generated for $K=2^n$-bit data needs to occupy $(n+2)$-bit space. When K=64, n=6, and n+2=8. Therefore, an independent ECC partition is generally configured in the DRAM chip, and an address of the ECC partition is the same as an address of a DRAM partition.

Figure 1:
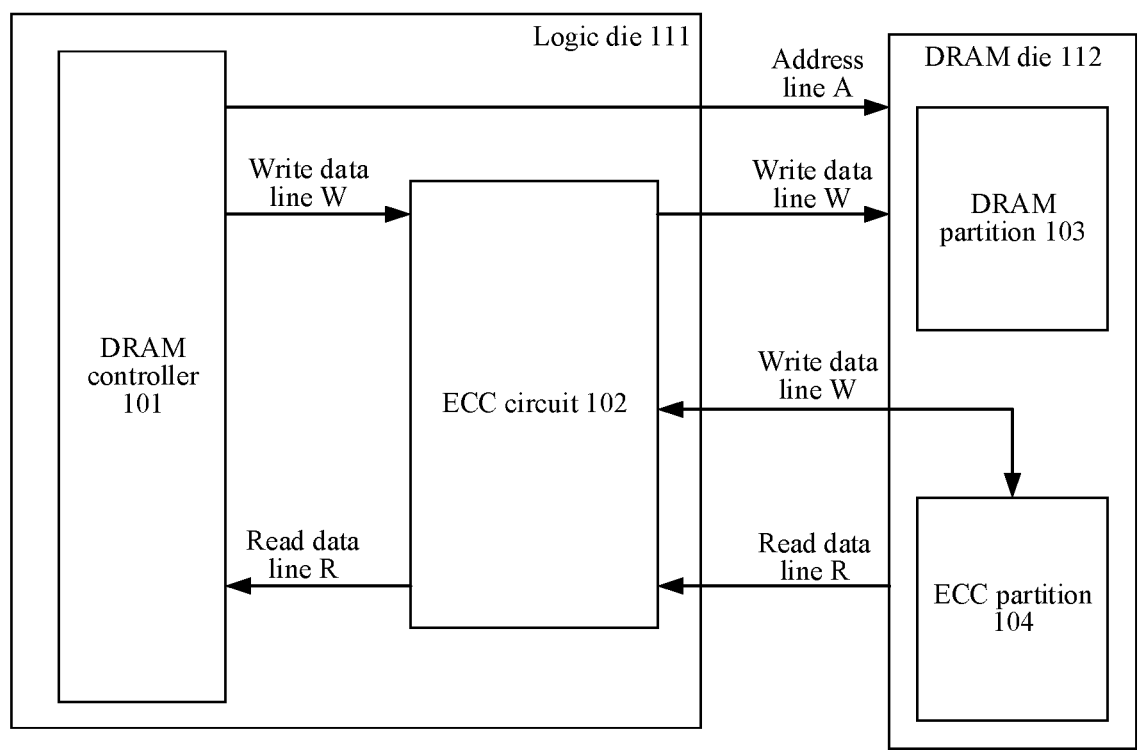
FIG. 1 is a schematic diagram of a DRAM chip according to an embodiment.

FIG. 1 is a schematic diagram of a structure of an example of a DRAM chip according to an embodiment of this disclosure. As shown in FIG. 1, a DRAM chip 100 may include a DRAM controller 101, an ECC circuit 102, a DRAM partition 103, and an ECC partition 104. The DRAM partition 103 and the ECC partition 104 may be deployed according to a ratio of data to an error correcting code (which may be understood as a ratio of a data length to a quantity of bits in the error correcting code), that is, 8:1.

In this example, the DRAM controller 101 is coupled to the DRAM partition 103 through an address line A, the DRAM controller 101 is coupled to the ECC circuit 102 through data lines (including a write data line W and a read data line R), and the ECC circuit 102 is coupled to the DRAM partition 103 and the ECC partition 104 through data lines (including a write data line W and a read data line R).

The ECC circuit 102 may include an ECC generation module 1021 and an ECC check module 1022. The ECC generation module 1021 is configured to generate an error correcting code corresponding to data, and the ECC check module 1022 is configured to check a to-be-corrected code, and correct the to-be-corrected code based on the error correcting code when a 1-bit error is detected.

In actual packaging, the DRAM chip 100 may include a logic die (logic die/basic die) 111 and at least one DRAM die 112. The DRAM controller 101 and the ECC circuit 102 may be integrated into the logic die 111, and the DRAM partition 103 and the ECC partition 104 may be integrated into one DRAM die 112. The logic die 111 and each DRAM die 112 are separately packaged, or the logic die 111 and the DRAM die 112 may be packaged together after 2.5D (2.5 dimension) stacking or 3D (3 dimension) stacking. Certainly, a logic die and a DRAM die may alternatively be implemented in another form. This is not limited in this embodiment.

Still refer to FIG. 1. A data read/write procedure of the DRAM chip 100 may be shown as follows:

First, the data write procedure may include the following steps.

Step 1: The DRAM controller 101 receives a write instruction from a user side, and outputs a write operation instruction and a write address to the DRAM die 112 through the address line A.

Step 2: The DRAM controller 101 outputs write data to the ECC circuit 102 through the write data line W.

Step 3: The ECC circuit 102 generates a corresponding error correcting code for the write data.

Step 4: The ECC circuit 102 outputs the write data and the corresponding error correcting code to the DRAM die 112 through the write data line W.

The write data is output to the DRAM partition 103, and the error correcting code is output to the ECC partition 104.

During actual application, the DRAM chip may generate an 8-bit error correcting code for 64-bit data.

Step 5: In response to the write operation instruction, the DRAM die 112 writes the write data into the DRAM partition 103 based on the write address, and writes the error correcting code into the ECC partition 104 based on the write address.

Second, the data read procedure may include the following steps:

Step 1: The DRAM controller 101 receives a read instruction from a user side, and outputs a read operation instruction and a read address to the DRAM die 112 through the address line A.

Step 2: In response to the read operation instruction, the DRAM die 112 reads read data and a corresponding error correcting code respectively from the DRAM partition 103 and the ECC partition 104 based on the read address.

Step 3: The DRAM die 112 outputs the read data and the corresponding error correcting code to the ECC circuit 102 through the read data line R.

Step 4: The ECC circuit 102 checks the read data.

Step 5: If the ECC circuit 102 detects a 1-bit error, the ECC circuit 102 performs error correction on the read data based on the error correcting code, and outputs the corrected read data to the DRAM controller 101 through the read data line R. If the ECC circuit 102 detects no error, the ECC circuit 102 outputs the read data to the DRAM controller 101 through the read data line R.

Step 6: The DRAM controller 101 outputs the read data from the ECC circuit 102 to the user side.

It can be learned from the foregoing that, because a soft error of the DRAM chip is related to an actual scenario, it is impossible to predict a DRAM partition that has a high probability of soft error, and ECC partitions need to be configured for all partitions. In this way, for a partition in which no soft error occurs or in a scenario in which data soft error is insensitive (high fault tolerance), it is actually a waste to configure ECC partitions for all partitions, and overall costs of the DRAM chip are increased.

In addition, some DRAM chips may support using an ECC partition in the foregoing DRAM die as a common data partition (that is, expanding the DRAM partition by using the ECC partition), to increase an available capacity of the DRAM chip. However, in such a scenario, there may be no ECC partition in the DRAM die. In this case, for an actual working status (for example, an occasional soft error caused by a high temperature) of the DRAM chip, data in the DRAM zone cannot be effectively protected.

To resolve the foregoing problem, embodiments of this disclosure provide a storage apparatus. The storage apparatus may include a first memory, a second memory, and a storage controller. The first memory and the second memory are disposed in different dies. In other words, the first memory and the second memory are physically disposed independently.

The first memory may be configured to store data, and the second memory may be configured to store an error correcting code corresponding to the data in the first memory. The storage controller and the first memory are coupled through an address line and data lines (including a write data line and a read data line). The storage controller may be configured to write first data into the first memory through the address line and the write data line, or read second data from the first memory through the address line and the read data line.

For example, the first memory may be implemented in a form of a DRAM die. The first memory may be one or more DRAM dies.

In some possible implementations, the first memory may alternatively be a memory such as a 3D stacked static random access memory (SRAM) or a nonvolatile memory (NVM).

For example, the second memory may be implemented in a form of an SRAM die. The second memory may be one or more SRAM dies.

Certainly, during actual application, the first memory and the second memory may alternatively be implemented in another form. This is not limited in this embodiment.

In this embodiment of this disclosure, the first memory and the second memory are integrated into different dies, so that the data and the error correcting code are stored in different memories. In this case, a zone in the first memory does not need to be allocated to the error correcting code, to prevent the error correcting code from occupying storage space of the first memory, and improve a capacity of available data in the first memory. For example, in a DRAM scenario, different from the embodiment in FIG. 1, the first memory (for example, a DRAM) and the second memory (for example, an SRAM) are integrated into different dies, and the data and the corresponding error correcting code are respectively stored in the first memory and the second memory. In this way, corresponding storage space in the DRAM does not need to be allocated to the error correcting code, to reduce storage space fixedly configured for the error correcting code in the DRAM, and improve an available data capacity of the DRAM.

Further, because the data and the error correcting code are respectively stored in the first memory and the second memory, and the second memory and the first memory are disposed in different dies, the error correcting code does not protect only data in a data partition that is in a same die as an error correcting code partition, as described in the embodiment of FIG. 1, but can protect data in one or more first memories, to implement that a plurality of first memories share one second memory.

In addition, as described in the embodiment shown in FIG. 1, because a soft error of the DRAM is related to an actual scenario, it is impossible to predict a data partition that has a high probability of soft error. Therefore, regardless of whether data protection is required, all data partitions are configured with error correcting code partitions. However, in this way, for a data partition in which no soft error occurs or in a scenario in which a data soft error is insensitive (with strong fault tolerance), it is a waste to configure error correcting code partitions for all data partitions. In this embodiment of this disclosure, because the data partition is disposed in the first memory, the error correcting code partition is disposed in the second memory, and the second memory and the first memory are disposed in different dies, a zone in the second memory can be flexibly allocated to a zone that actually requires data protection in the first memory, and not all data partitions are allocated with error correcting code partitions. In this way, error correcting code storage resources can be saved, an area in which data protection is performed can be flexibly adjusted based on an actual requirement and a working state, and utilization of error correcting code storage resources is improved.

Optionally, the first memory and the second memory may be deployed according to a ratio. For example, the first memory and the second memory may be deployed according to a ratio of data to an error correcting code (which may be understood as a ratio of a data length to a quantity of bits in the error correcting code) that is 512:1, 256:1, 128:1, or 64:1. Certainly, the ratio of the data to the error correcting code may be another ratio, provided that storage space of the error correcting code is far less than storage space of the data. This is not limited in this embodiment.

In this embodiment of this disclosure, that storage space of the error correcting code is far less than storage space of the data may be understood as: An error correcting code with a small address range is used to protect data in a large address range. In this way, error correcting code storage resources are saved, and utilization of error correcting code storage resources is improved.

Further, for example, in the embodiment in FIG. 1, regardless of whether all storage areas on an 8 gigabit (Gbit) DRAM requires ECCs, a 1 Gbit error correcting code storage area needs to be fixedly configured. For data that does not need to be protected, additional power consumption and an additional area are paid, causing a waste. However, in this embodiment of this disclosure, only a 128 Mbit second memory needs to be deployed for an 8 Gbit first memory, to greatly save error correcting code storage resources and increase a capacity of available data in the DRAM.

It should be noted that, in this embodiment of this disclosure, an example in which the first memory is a DRAM and the second memory is an SRAM is used for description.

Further, the first memory may be divided into a plurality of DRAM zones, and the second memory may also be divided into a plurality of SRAM zones. A quantity of DRAM zones and a quantity of SRAM zones may be configured with reference to the foregoing ratio of data to an error correcting code. In addition, there may be a configurable mapping relationship of zone addresses between the first memory and the second memory. The mapping relationship is configured, so that different SRAM zones are allocated to different DRAM zones as storage space of corresponding error correcting codes, to support flexible sharing of the second memory by the first memory. Further, if a DRAM zone requires data protection, a corresponding SRAM zone is configured for the DRAM zone. On the contrary, if a DRAM zone does not require data protection, no corresponding SRAM zone is configured for the DRAM zone.

In this embodiment of this disclosure, configurable protection configuration information may be set. The protection configuration information may include a mapping relationship between an address of a zone in the first memory and an address of a zone in the second memory. The protection configuration information is configured, to change the foregoing mapping relationship, so that a zone in the second memory can be flexibly allocated to a zone that requires data protection in the first memory, and does not need to fixedly correspond to all DRAM zones. In this way, for a data partition with small access traffic, a corresponding error correcting code storage resource may not be configured, to save error correcting code storage resources, so as to adjust, based on an actual requirement and a working state, an area in which data protection is performed, and improve utilization of error correcting code storage resources.

During actual application, the protection configuration information may include a mapping relationship between an address of a DRAM zone requiring data protection and an address of an SRAM zone allocated to the DRAM zone. In this case, as long as the protection configuration information includes an address-to-address mapping relationship of a DRAM zone, it indicates that data corresponding to the DRAM zone is data that needs to be protected. The protection configuration information includes no address-to-address mapping relationship of a DRAM zone, it indicates that data corresponding to the DRAM zone is data that does not need to be protected.

Alternatively, the protection configuration information may further include a mapping relationship between addresses of all DRAM zones and addresses of SRAM zones. An address of a DRAM zone requiring data protection corresponds to an address of an SRAM zone allocated to the DRAM zone, and an address of an SRAM zone corresponding to an address of a DRAM zone requiring no data protection may be set to "0", "null", or the like. In this case, as long as an address of an SRAM zone corresponding to a DRAM zone exists, it indicates that data corresponding to the DRAM zone is data that needs to be protected, and a DRAM zone whose mapping address is "0", "null", or the like indicates that data corresponding to the DRAM zone is data that does not need to be protected.

Figures 2, 3:
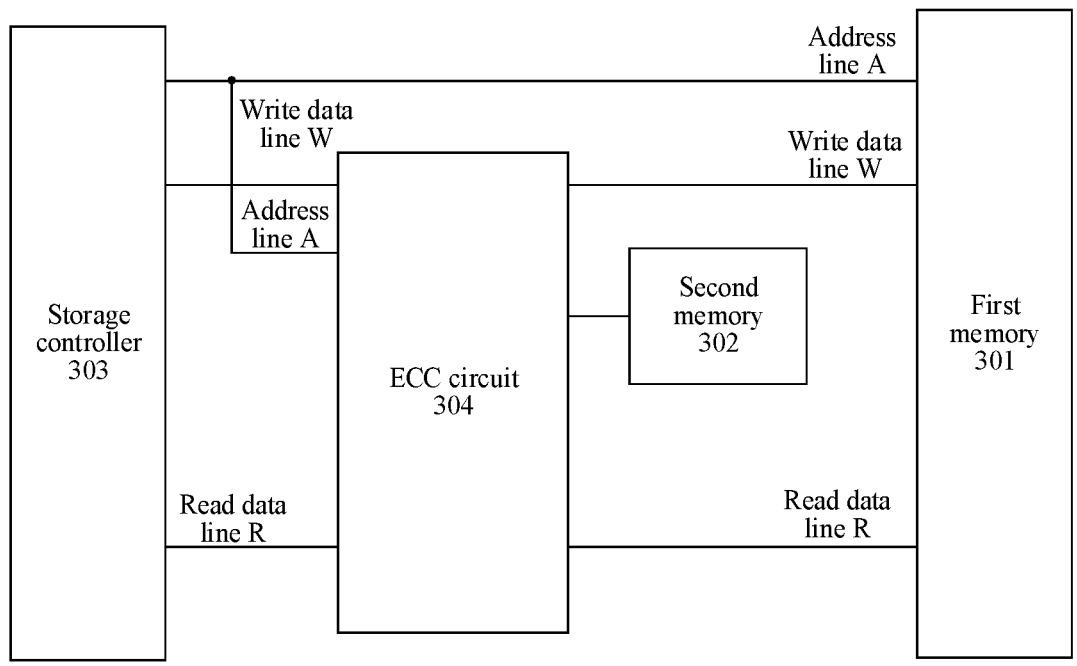
FIG. 2 is a schematic diagram of protection configuration information according to an embodiment.
FIG. 3 is a schematic diagram of a structure of a storage apparatus according to an embodiment.

For example, it is assumed that the first memory is divided into 512 DRAM zones, and the second memory is divided into 8 zones. FIG. 2 is a schematic diagram of the protection configuration information according to an embodiment of this disclosure. The protection configuration information is implemented in a form of a table. Refer to FIG. 2. DRAM zones (represented by high end addresses of zones) that require data protection, for example, channel0+bank1 (that is, a bank 1 in a channel 0), channel0+bank63, channel 1+bank62, . . . , and channel7+bank63, each are allocated with one SRAM zone (represented by storage addresses of zones), for example, zone0 to zone7. A mapping address of the DRAM zone that does not require data protection is "0".

It should be noted that the high end address is a first part of an address (which may include a Channel identifier+a Bank address) of a storage address of the DRAM zone. Correspondingly, a last part of the storage address is a low end address of the DRAM zone. For example, the storage address of the DRAM zone may be 16 bits, and then first 8 bits are the high end address of the DRAM zone, and correspondingly, last 8 bits are the low end address of the DRAM zone. For example, the storage address of the DRAM zone is channel0+bank1+00010110, the high end address is channel0+bank1, and the low end address is 00010110.

In some possible implementations, in addition to the two entries of the DRAM zone and the SRAM zone, the protection configuration information may further include an identifier "whether ECC is required". The identifier may indicate whether the DRAM zone requires data protection, or the identifier may indicate whether data corresponding to the DRAM zone is data that needs to be protected, whether an error correcting code corresponding to the DRAM zone exists, whether a corresponding SRAM zone is configured for the DRAM zone, or the like.

In some possible implementations, a low end address of each zone in the first memory is the same as a storage address of each zone in the second memory. For example, a storage address of a DRAM zone requiring data protection is channel0+bank1+00010110, and an address of an SRAM zone corresponding to the DRAM zone may be a low end address 00010110 of the DRAM zone.

In some possible implementations, FIG. 3 is a schematic diagram of a structure of a storage apparatus according to an embodiment of this disclosure. As shown in FIG. 3, a storage apparatus 300 may include a first memory 301, a second memory 302, a storage controller 303, and an ECC circuit 304. The first memory 301 and the second memory 302 are disposed in different dies. The storage controller 303 is coupled to the first memory 301 through an address line A. The storage controller 303 is coupled to the ECC circuit 304 through data lines (including a write data line W and a read data line R) and the address line A. The ECC circuit 304 is coupled to the first memory 301 and the second memory 302 through a data line.

Herein, the first memory 301, the second memory 302, and the storage controller 303 are consistent with the first memory, the second memory, and the storage controller in the foregoing embodiment.

In some possible implementations, the ECC circuit is further configured to: when determining that first data is data that needs to be protected, generate a first error correcting code corresponding to the first data; and when determining that second data is data that needs to be protected, perform error correction on the second data based on a second error correcting code corresponding to the second data.

In this embodiment of this disclosure, when determining that the first data and the second data are data that needs to be protected, the ECC circuit performs an ECC operation (for example, generating an error correcting code, and performing error correction based on an error correcting code) on the first data and the second data. In this way, an ECC operation is selectively performed on data, and utilization of error correcting code storage resources is improved while effective data protection is ensured.

Optionally, the ECC circuit 304 is further configured to monitor the address line between the storage controller 303 and the first memory 301, to obtain a write address (that is, a first address) or a read address (a second address) of data.

The ECC circuit 304 may be configured to: determine, based on the write address and the protection configuration information, whether the first data is data that needs to be protected; and determine, based on the read address and the protection configuration information, whether the second data is data that needs to be protected.

For example, if the write address is channel0+bank1+ 00010110, the ECC circuit may determine, by searching the protection configuration information shown in FIG. 2, that a DRAM zone whose high end address is "channel0+bank1" requires data protection. In this case, the ECC circuit may generate the first error correcting code corresponding to the first data. Similarly, if the read address is channel0+bank63+ 0100101, the ECC circuit may determine, by searching the protection configuration information shown in FIG. 2, that a DRAM zone whose high end address is "channel0+bank63" requires data protection. In this case, the ECC circuit performs error correction on the second data based on the second error correcting code.

Further, the storage controller is further configured to output the first data to the ECC circuit. In this case, the ECC circuit is further configured to: when determining that the first data is data that needs to be protected, generate the first error correcting code, and write the first error correcting code into the second memory; and write the first data into a first zone in the first memory based on the write address.

The ECC circuit is further configured to: read the second data from a third zone in the second memory based on the read address; when determining that the second data is data that needs to be protected, read the second error correcting code from the second memory, and perform error correction on the second data based on the second error correcting code; and output the error-corrected second data to the storage controller.

In some possible embodiments, the ECC circuit and the second memory may be disposed in a same die; or the ECC circuit and the second memory may be disposed in different dies.

Further, the ECC circuit and the storage controller may be disposed in a same die, or the ECC circuit and the storage controller may be disposed in different dies.

It may be understood that the ECC circuit, the second memory, and the storage controller may be integrated into a same die, or may be integrated into different dies. For example, the ECC circuit and the storage controller are integrated into one die, and the second memory is integrated into another die. Certainly, there may be different implementations. This is not limited in this embodiment.

The following describes a data read/write procedure of the storage apparatus with reference to the structure of the foregoing storage apparatus.

Figure 4:
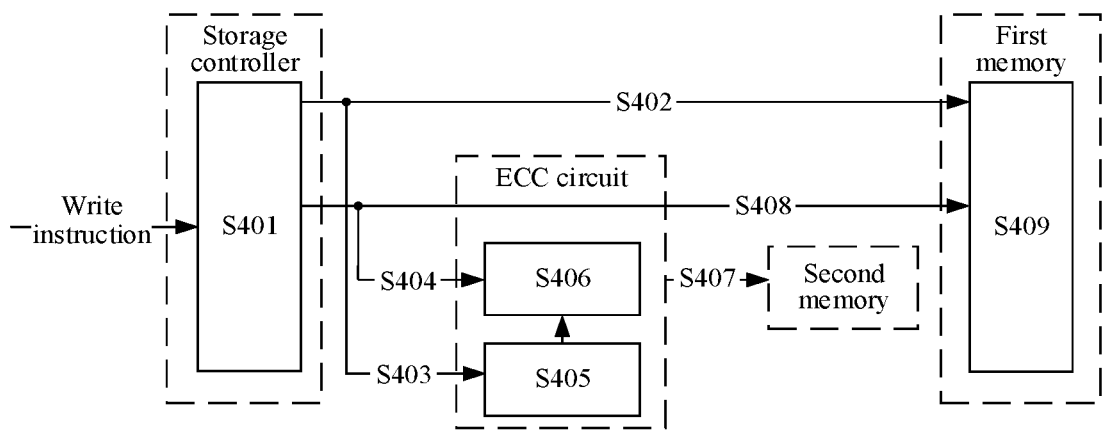
FIG. 4 is a schematic diagram of a data write procedure of a storage apparatus according to an embodiment.

FIG. 4 is a schematic diagram of a data write procedure of a storage apparatus according to an embodiment of this disclosure. As shown in FIG. 4, the data write procedure may include the following steps.

S401: A storage controller receives a write instruction from a user side.

S402: The storage controller outputs a write operation instruction and a write address (that is, a first address of a first zone) to a first memory through an address line.

S403: The storage controller outputs the write address to an ECC circuit.

S404: The storage controller outputs first data (that is, write data) to the ECC circuit through a write data line.

S405: The ECC circuit determines, based on the write address, whether the first data is data that needs to be protected; and if yes, obtains a second address of a second zone in a second memory, and performs S406; or if no, performs S408.

In some possible embodiments, after obtaining the write address, the ECC circuit may obtain a high end address (for example, Channel ID+Bank address) of the write address, and then search protection configuration information (as shown in FIG. 2) by using the high end address, to determine whether the first data is data that needs to be protected, that is, determine whether the first zone requires data protection. For example, the write address is channel0+bank1, and the ECC circuit searches the protection configuration information shown in FIG. 2, and determines, based on an identifier "whether ECC is required", that the data corresponding to channel0+bank1 is data that needs to be protected, that is, determines that the first zone requires data protection. In this way, the ECC circuit may obtain, by using the protection configuration information, an SRAM zone address (a third address) corresponding to channel0+bank1, that is, zone0.

S406: The ECC circuit generates an error correcting code (that is, a first error correcting code) corresponding to the first data.

S407: The ECC circuit writes the error correcting code corresponding to the first data into a second zone based on the third address.

S408: The ECC circuit outputs the first data to the first memory through the write data line.

In some possible implementations, if the ECC circuit determines, based on the write address, that the first data is data that does not need to be protected, in S408, the storage controller may output the first data to the first memory in a transparent transmission mode through the ECC circuit.

S409: The first memory writes the first data into the first zone based on the write address in response to the write operation instruction.

In S401 to S409, an execution time sequence of a process in which the storage controller writes the first data into the first zone and a process in which the ECC circuit generates and stores the error correcting code corresponding to the first data is not limited.

Figure 5:
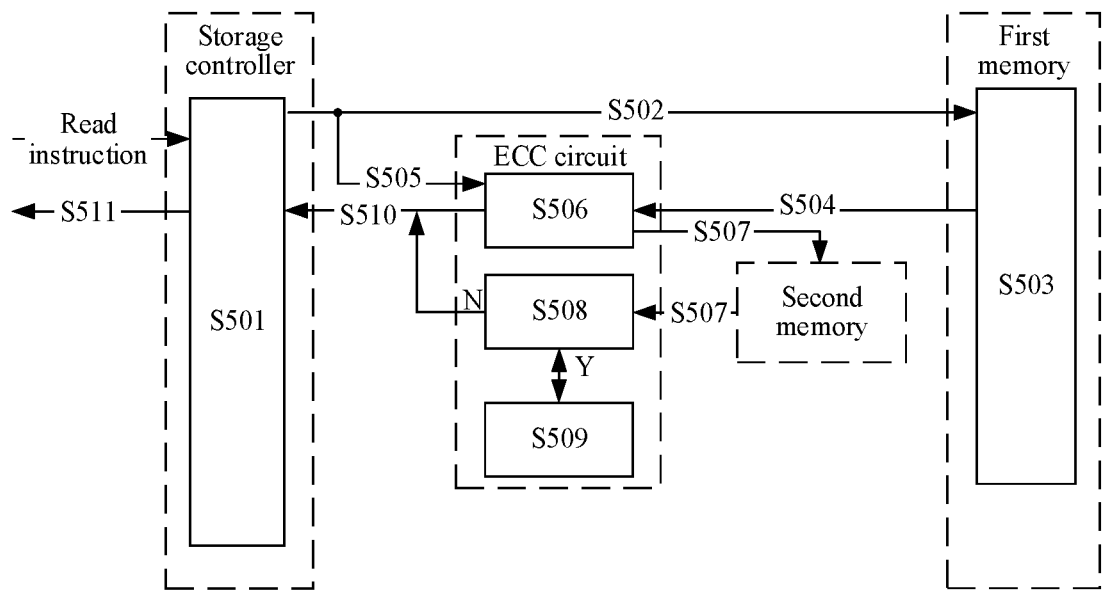
FIG. 5 is a schematic diagram of a data read procedure of a storage apparatus according to an embodiment.

In some possible implementations, FIG. 5 is a schematic diagram of a data read procedure of a storage apparatus according to an embodiment of this disclosure. As shown in FIG. 5, the data read procedure may include the following steps.

S501: A storage controller receives a read instruction from a user side.

S502: The storage controller outputs a read operation instruction and a read address (that is, a second address of a second zone) to a first memory through an address line.

S503: In response to the read operation instruction, the first memory reads second data (that is, read data) from the second zone based on the read address.

S504: The first memory outputs the second data to an ECC circuit through a read data line.

S505: The storage controller outputs the read address to the ECC circuit.

S506: The ECC circuit determines, based on the read address, whether the second data is data that needs to be protected; and if yes, obtains a fourth address of a fourth zone in a second memory, and performs S507; or if no, performs S510.

In some possible embodiments, after obtaining the read address, the ECC circuit may obtain a high end address (for example, Channel ID+Bank address) of the read address, and then search protection configuration information (as shown in FIG. 2) by using the high end address, to determine whether the second data is data that needs to be protected. Herein, a process of determining, by the ECC circuit, whether the second data is data that needs to be protected is similar to the foregoing process of determining whether the first data is data that needs to be protected, and details are not described herein again.

S507: The ECC circuit reads an error correcting code (that is, a second error correcting code) corresponding to the second data from the fourth zone based on the fourth address.

S508: The ECC circuit checks the second data based on the error correcting code; and if the ECC circuit detects an error, performs S509; or if the ECC circuit detects no error, performs S510.

During actual application, the first data and the second data may include a plurality of bits. When detecting a cell (that is, 1 bit) error, the ECC circuit performs S509.

S509: The ECC circuit performs error correction on the second data.

S510: The ECC circuit outputs the second data to the storage controller through the read data line.

Herein, in S510, the ECC circuit may output the second data or the error-corrected second data to the storage controller.

In some possible implementations, if the ECC circuit determines, based on the write address, that the second data is data that does not need to be protected, in S510, the first memory may output the second data to the storage controller in a transparent transmission mode through the ECC circuit.

S511: The storage controller outputs the second data from the ECC circuit to the user side.

It can be learned from the foregoing that because the data partition is disposed in the first memory, the error correcting code partition is disposed in the second memory, and the second memory and the first memory are disposed in different dies, a zone in the second memory can be flexibly allocated to a zone that requires data protection in the first memory, and not all data partitions are allocated with error correcting code partitions. In this way, error correcting code storage resources can be saved, an area in which data protection is performed can be flexibly adjusted based on an actual requirement and a working state, and utilization of error correcting code storage resources is improved.

Further, because the data partition is disposed in the first memory, the error correcting code partition is disposed in the second memory, and the second memory and the first memory are disposed in different dies, the ECC circuit may perform an ECC operation (for example, generating an error correcting code or performing error correction based on the error correcting code) on the first data and the second data when determining that the first data and the second data are data that needs to be protected, and transparently transmit the first data and the second data when determining that the first data and the second data are data that does not need to be protected. In this way, an ECC operation is selectively performed on data, and this improves utilization of error correcting code storage resources while ensuring effective data protection.

Figure 6:
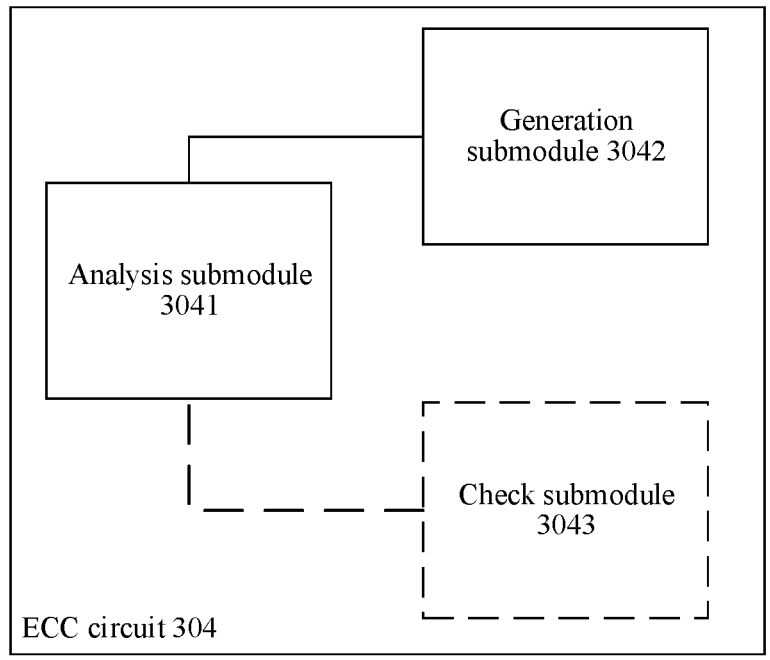
FIG. 6 is a schematic diagram of a structure of an ECC circuit according to an embodiment.

In some possible implementations, to improve utilization of error correcting code storage resources, FIG. 6 is a schematic diagram of a structure of an ECC circuit according to an embodiment of this disclosure. Refer to solid lines in FIG. 6. The ECC circuit 304 may include an analysis submodule 3041 and a generation submodule 3042.

The analysis submodule is configured to: obtain a write address from a storage controller; determine, based on the write address and protection configuration information, that first data is data that needs to be protected; and output a first instruction to the generation submodule, to instruct to generate a first error correcting code. The generation submodule is configured to: in response to the first instruction, generate the first error correcting code.

Figure 7:
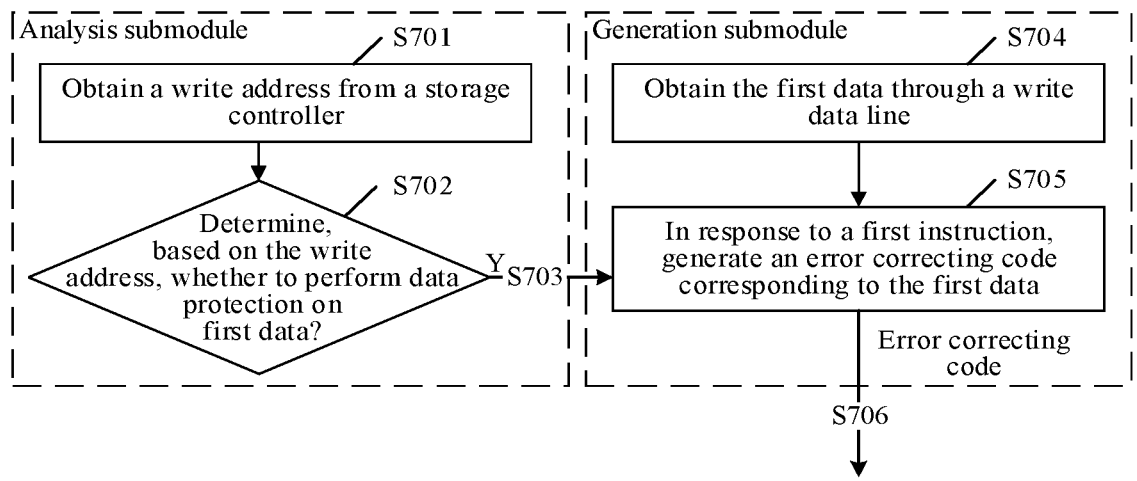
FIG. 7 is a schematic diagram of a working procedure of an ECC circuit in a data write procedure according to an embodiment.

With reference to the data write procedure of the storage apparatus in FIG. 4, FIG. 7 is a schematic diagram of a working procedure of an ECC circuit in the data write procedure according to an embodiment of this disclosure. Refer to FIG. 7. The working procedure of the ECC circuit may include the following steps.

S701: An analysis submodule obtains a write address from a storage controller.

S702: The analysis submodule determines, based on the write address and protection configuration information, whether first data is data that needs to be protected; and if yes, performs S703; or if no, makes no response.

Further, when performing S702, the analysis submodule may search the preset protection configuration information for the write address. When a searching result indicates that the write address requires data protection, the first data may be determined as data that needs to be protected.

S703: The analysis submodule outputs a first instruction to a generation submodule.

S704: The generation submodule obtains the first data through a write data line.

S705: In response to the first instruction, the generation submodule generates an error correcting code corresponding to the first data.

S706: The generation submodule writes the error correcting code corresponding to the first data into a second memory.

In some possible embodiments, after the analysis submodule determines, by searching the protection configuration information (as shown in FIG. 2) in S702, that the first data is data that needs to be protected, the analysis submodule may further obtain, by using the protection configuration information, a third address corresponding to the write address. Subsequently, the analysis submodule outputs the third address to the generation submodule by using the first instruction. Next, when performing S706, the generation submodule writes the error correcting code corresponding to the first data into a third zone in the second memory based on the third address.

It should be noted that, in S701 to S706, an execution sequence of S701 to S703 and S704 is not limited.

In some possible implementations, refer to the dashed lines in FIG. 6, the ECC circuit 304 may further include a check submodule 3043.

The analysis submodule is further configured to: obtain a read address; determine, based on the read address, that second data is data that needs to be protected; and output a second instruction to the check submodule, to instruct to read a second error correcting code. The check submodule is configured to: in response to the second instruction, read the second error correcting code from a second memory.

Figure 8:
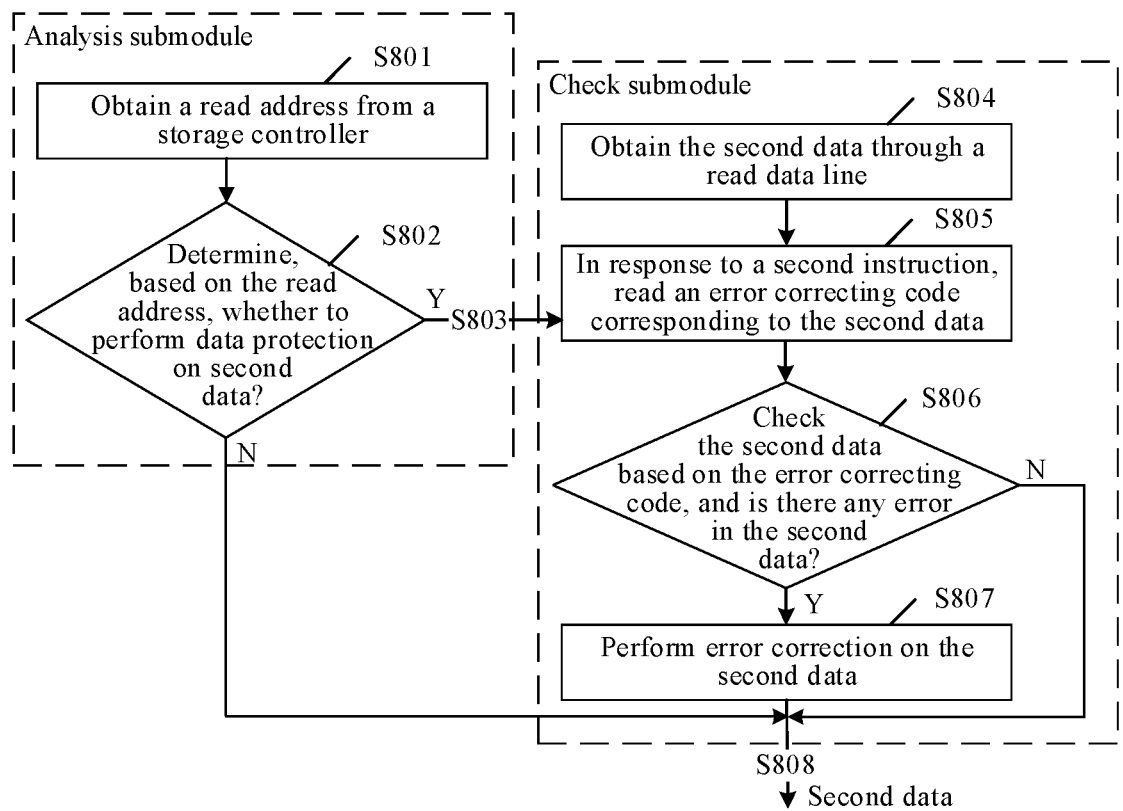
FIG. 8 is a schematic diagram of a working procedure of an ECC circuit in a data read procedure according to an embodiment.

With reference to the data read procedure of the storage apparatus in FIG. 5, FIG. 8 is a schematic diagram of a working procedure of an ECC circuit in the data read procedure according to an embodiment of this disclosure. Refer to FIG. 8. The working procedure of the ECC circuit may include the following steps.

S801: An analysis submodule obtains a read address from a storage controller.

S802: The analysis submodule determines, based on the read address, whether second data is data that needs to be protected; and if yes, performs S803; or if no, performs S808.

Further, when performing S802, the analysis submodule may search preset protection configuration information for the read address. When a searching result indicates that the read address requires data protection, the second data may be determined as data that needs to be protected.

S803: The analysis submodule outputs a second instruction to a check submodule.

S804: The check submodule obtains the second data through a read data line.

S805: In response to the second instruction, the check submodule reads an error correcting code corresponding to the second data from a second memory.

S806: The check submodule checks the second data based on the error correcting code; and if a 1-bit error is detected, performs S807; or if no error is detected, performs S808.

S807: The check submodule performs error correction on the second data.

S808: The check submodule outputs the error-corrected second data to the storage controller.

In some possible embodiments, after the analysis submodule determines, by searching the protection configuration information (as shown in FIG. 2) in S802, that the second data is data that needs to be protected, the analysis submodule may further obtain, by using the protection configuration information, a fourth address corresponding to the read address. Then, the analysis submodule outputs the fourth address to the check submodule by using the second instruction. Next, when performing S805, the check submodule reads the error correcting code corresponding to the second data from a fourth zone in the second memory based on the fourth address.

It should be noted that, in S801 to S808, an execution sequence of S801 to S803 and S804 is not limited.

In this embodiment of this disclosure, the analysis submodule is further configured to: when the storage apparatus is in a working state, control the ECC circuit to work or not, to enable or disable a data protection function of the storage apparatus.

The following example describes a data read/write procedure of the storage apparatus.

Figure 9:
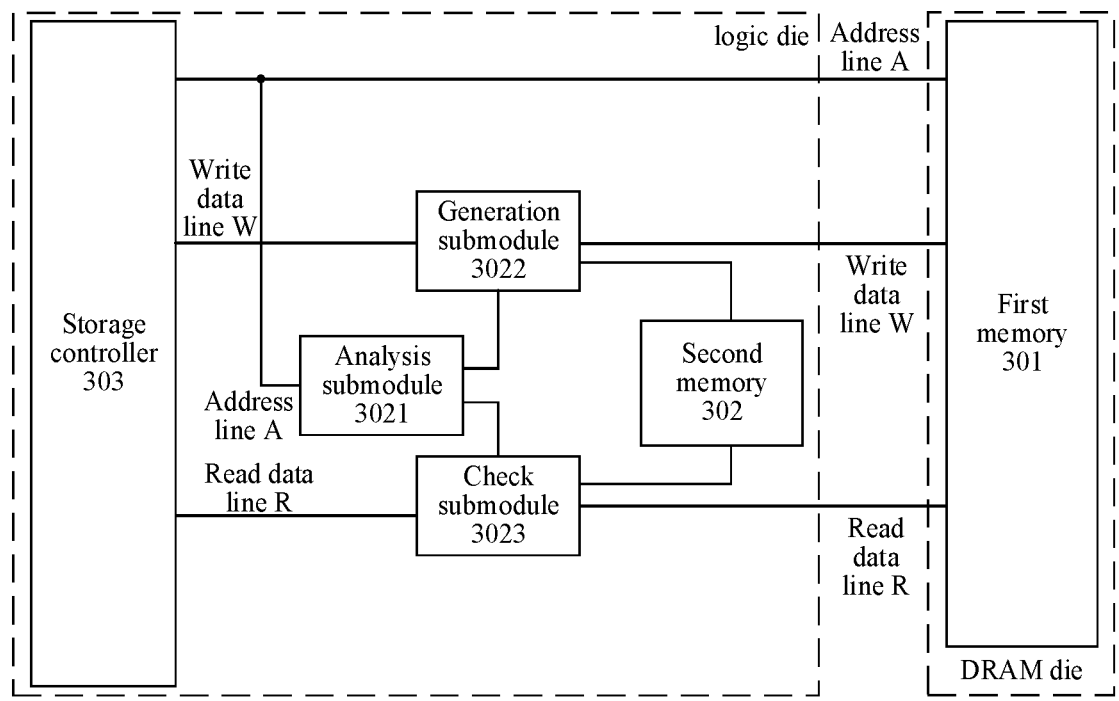
FIG. 9 is a schematic diagram of another structure of a storage apparatus according to an embodiment.

FIG. 9 is another schematic diagram of a structure of a storage apparatus according to an embodiment of this disclosure. With reference to FIG. 9, a data read/write procedure of the storage apparatus may be as follows:

Write Procedure:

Step 1: A storage controller 303 receives a write instruction from a user side.

Step 2: The storage controller 303 outputs a write operation instruction and a write address (for example, channel0+bank1) to a first memory 301 through an address line.

Step 3: The storage controller 303 outputs the write address to an analysis submodule 2021.

For example, after receiving the write instruction of a user, a DRAM controller (that is, the storage controller 303) sends a corresponding operation instruction according to a DRAM time sequence requirement, and also sends a DRAM write address to an ECC address analysis module (that is, the analysis submodule 2021).

Step 4: The storage controller 303 outputs write data to a generation submodule 2022 through a write data line.

Step 5: The analysis submodule 2021 searches the table in FIG. 2 for the write address, determines that a zone whose address is channel0+bank1 requires data protection, and obtains a corresponding SRAM zone address, that is, zone0.

Step 6: The analysis submodule 2021 sends a first instruction and the SRAM zone address zone0 to the generation submodule 2022. Herein, the first instruction instructs to generate an ECC code.

For example, when receiving the write instruction from the DRAM controller, the ECC address analysis module may analyze an access address in the write instruction, and searches an ECC configuration table (that is, protection configuration information) by using a high end address of the write operation (for example, 3-bit channel ID+6-bit bank address BA5-BA0). If a corresponding entry indicates that the address segment requires ECC, the write operation belongs to a segment that requires ECC protection, and an ECC SRAM zone number may be obtained. If it is identified that the write operation belongs to a segment that requires ECC protection, the ECC address analysis module sends an ECC indication and a used ECC SRAM zone number (that is, an SRAM zone address) to the ECC generation module (that is, the generation submodule).

Step 7: In response to the first instruction, the generation submodule 2022 generates an error correcting code corresponding to first data.

Step 8: The generation submodule 2022 writes the error correcting code corresponding to the first data into the zone0.

Step 9: The storage controller 303 outputs the first data to the first memory 301 through the write data line.

For example, for a DRAM write operation, the ECC generation module performs ECC calculation based on the ECC indication from the ECC address analysis module, and generates a corresponding ECC check bit (that is, the first error correcting code) by using a data bit as a unit. The generated ECC check bit is sent to an ECC storage resource pool module (that is, a second memory) for processing. The write data is sent to a DRAM die (that is, the first memory) and stored in a corresponding DRAM storage unit (that is, a first zone).

Step 10: In response to the write operation instruction, the first memory 301 writes the first data into channel0+bank1.

In another embodiment, for example, if the ECC storage resource pool module receives the ECC indication from the ECC address analysis module, the ECC check bit sent by the ECC generation module may be written into a corresponding SRAM ECC storage address (the SRAM storage address is the same as a DRAM low end address). If the ECC storage resource pool module receives no ECC indication from the ECC address analysis module, it indicates that the address of the write operation does not belong to the segment that requires ECC protection, and no operation is performed.

Read Procedure:

Step 1: A storage controller 303 receives a read instruction from a user side.

Step 2: The storage controller 303 outputs a read operation instruction and a read address (for example, channel0+bank63) to a first memory 301 through an address line.

Step 3: The storage controller 303 outputs the read address to an analysis submodule 2021.

For example, for a DRAM read operation, a DRAM die receives a read instruction, and reads data from a data storage area. In addition, a read operation address is sent to an ECC address analysis module.

Step 4: The analysis submodule 2021 searches the table in FIG. 2 for the read address, determines that a DRAM zone whose address is channel0+bank63 requires data protection, and obtains a corresponding SRAM zone address, that is, zone1.

Step 5: The analysis submodule 2021 sends a second instruction and the SRAM zone address zone1 to a check submodule 2023. Herein, the second instruction instructs to read an ECC code.

For example, when receiving the read operation address controlled by the DRAM, the ECC address analysis module analyzes a high end address in the read operation address, and searches an ECC configuration table by using the high end address (for example, 3-bit channel ID+6-bit Bank address BA5-BA0) of the read operation. If a corresponding entry indicates that the address segment requires ECC, the read operation belongs to a segment that requires ECC protection, and an ECC SRAM zone number may be obtained. The ECC address analysis module sends an ECC indication that indicates that ECC check is required and the ECC SRAM zone number to an ECC check module and an ECC storage resource pool module. If it is identified that the read operation address does not belong to a segment that requires ECC protection, the ECC indication is not sent.

Step 6: In response to the second instruction, the check submodule 2023 reads an error correcting code corresponding to the second data from the zone 1.

For example, when receiving a read operation ECC indication sent by the ECC address analysis module, the ECC storage resource pool module sends, to the ECC check module, the corresponding ECC data read from an SRAM that stores ECC data.

Step 7: The first memory 301 reads the second data from channel0+bank63, and outputs the second data to the check submodule 2023.

For example, DRAM read data logic sends DRAM data of the read operation to the ECC check module according to a working time sequence of a chip.

Step 8: The check submodule 2023 checks the second data based on the error correcting code.

Step 9: If a 1-bit error is detected, the check submodule 2023 performs error correction on the second data.

Step 10: The check submodule 2023 outputs the error-corrected second data to the storage controller 203.

For example, if the ECC check module receives a data bit read by the DRAM, and also receives an ECC check bit sent by the ECC storage resource pool module and an ECC indication sent by the ECC address analysis module, ECC calculation check is performed. If a single-bit ECC error is detected, the data can be corrected and sent to the DRAM controller. If the ECC check module does not receive the ECC indication sent by the ECC address analysis module when receiving the data bit read by the DRAM, the ECC check module does not need to perform ECC calculation check, and directly sends the data to the DRAM controller.

Step 11: The storage controller 203 outputs the second data to the user side.

For example, the DRAM controller returns, to the user side, the read data on which ECC check/error correction is performed.

In an implementation process, the foregoing storage apparatus may use, but not limited to, the following manners for packaging.

Figure 10:
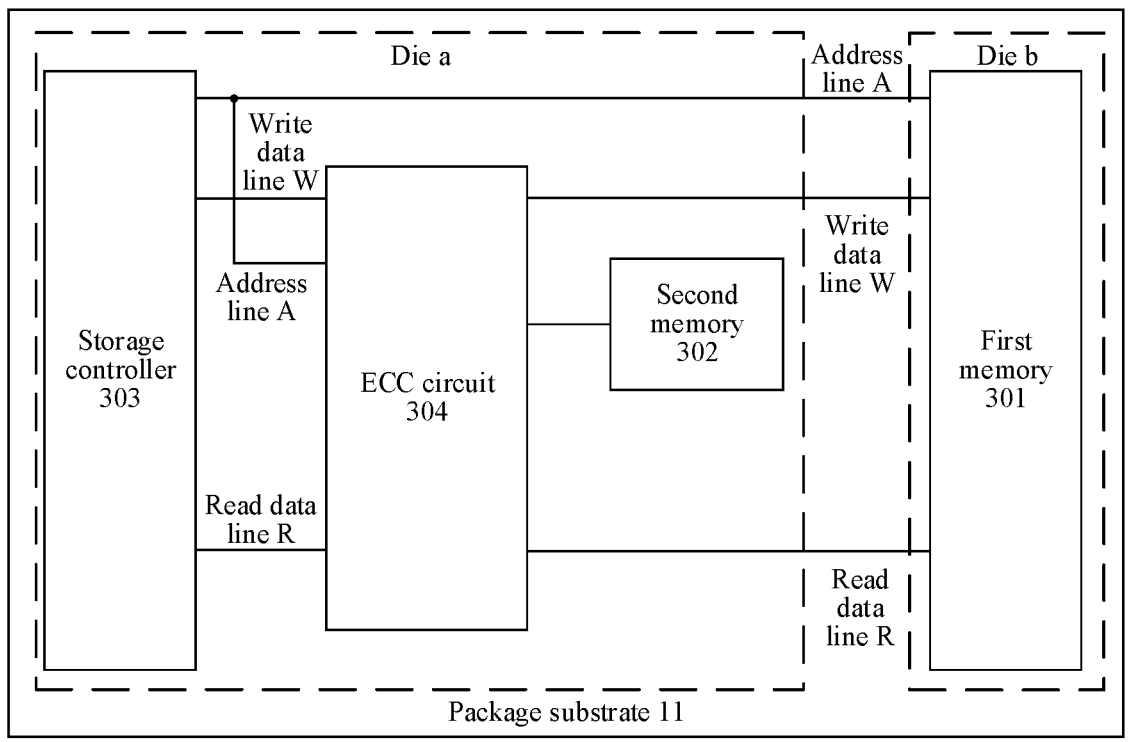
FIG. 10 is a schematic diagram of first packaging of a storage apparatus according to an embodiment.

First manner: FIG. 10 is a schematic diagram of first packaging of a storage apparatus according to an embodiment of this disclosure. As shown in FIG. 10, a first memory 301, a second memory 302, a storage controller 303, and an ECC circuit 304 are mounted on a same package substrate 11. The storage controller 303, the ECC circuit 304, and the second memory 302 are integrated into a same die a (for example, a logic die or a basic die). The first memory 301 is integrated into another die b (for example, a DRAM die), and is mounted on the package substrate 11.

During actual application, the ECC circuit 304 may communicate with the second memory 302 through an intra-die high-speed bus interface.

Figure 11:
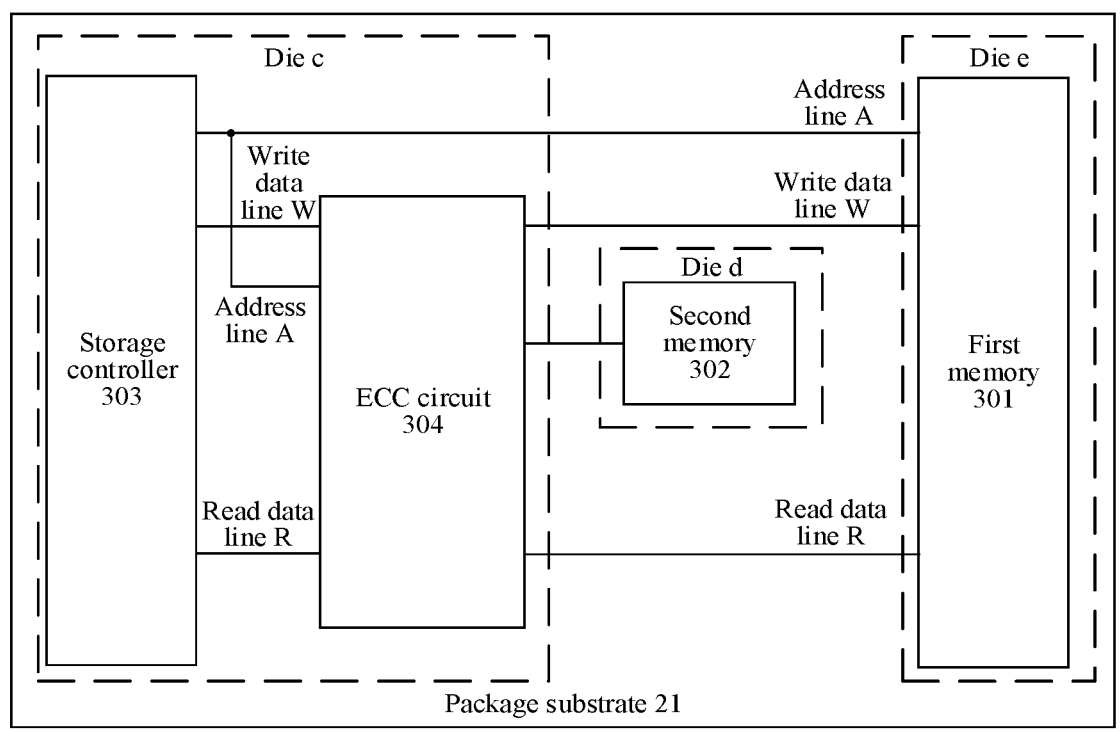
FIG. 11 is a schematic diagram of second packaging of a storage apparatus according to an embodiment.

Second manner: FIG. 11 is a schematic diagram of second packaging of a storage apparatus according to an embodiment of this disclosure. As shown in FIG. 11, a first memory 301, a second memory 302, a storage controller 303, and an ECC circuit 304 are mounted on a same package substrate 21. The storage controller 303 and the ECC circuit 304 are integrated into a die c (for example, a logic die or a basic die). The second memory 302 is integrated into a die d (for example, an SRAM die). The first memory 301 is integrated into another die e (for example, a DRAM die).

During actual application, the ECC circuit 304 may communicate with the second memory 302 through a high-speed interconnection interface such as die-to-die phy.

Figure 12:
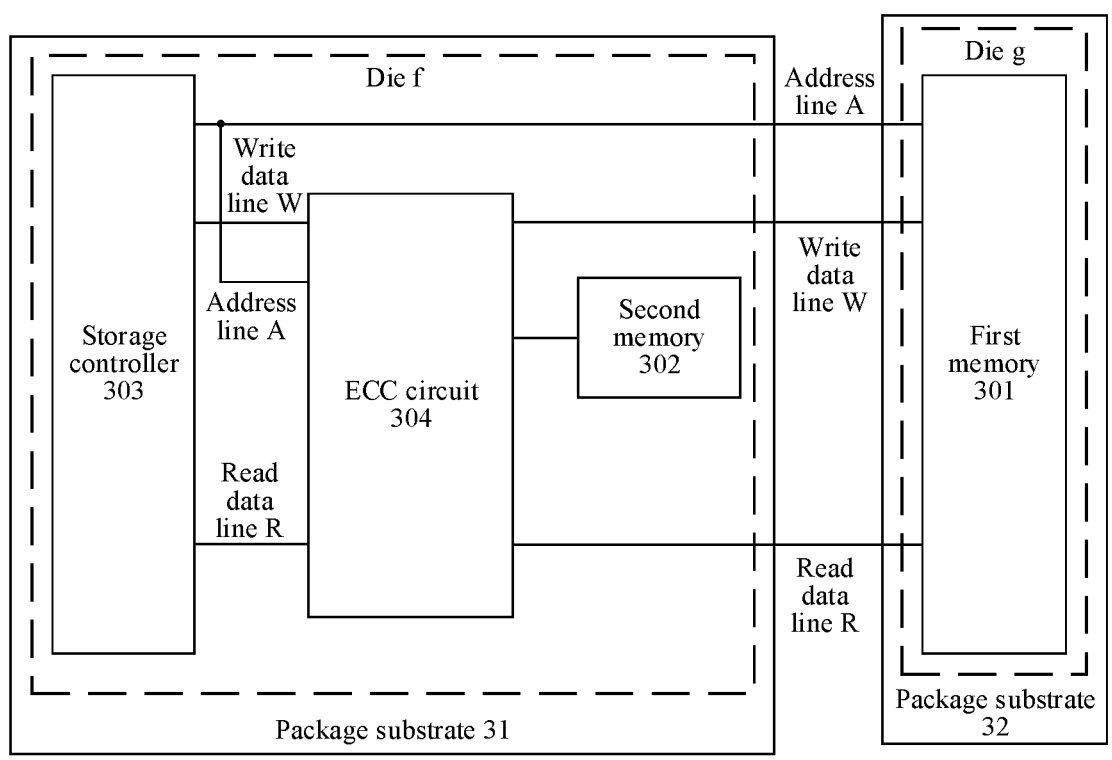
FIG. 12 is a schematic diagram of third packaging of a storage apparatus according to an embodiment.

Third manner: FIG. 12 is a schematic diagram of third packaging of a storage apparatus according to an embodiment of this disclosure. As shown in FIG. 12, a storage controller 303, an ECC circuit 304, and a second memory 302 are mounted on a package substrate 31. The storage controller 303, the ECC circuit 304, and the second memory 302 are integrated into a same die f (for example, a logic die or a basic die). The first memory 301 is integrated into another die g (for example, a DRAM die), and is mounted on a package substrate 32.

During actual application, the ECC circuit 304 may communicate with the second memory 302 through an intra-die high-speed bus interface.

Figure 13:
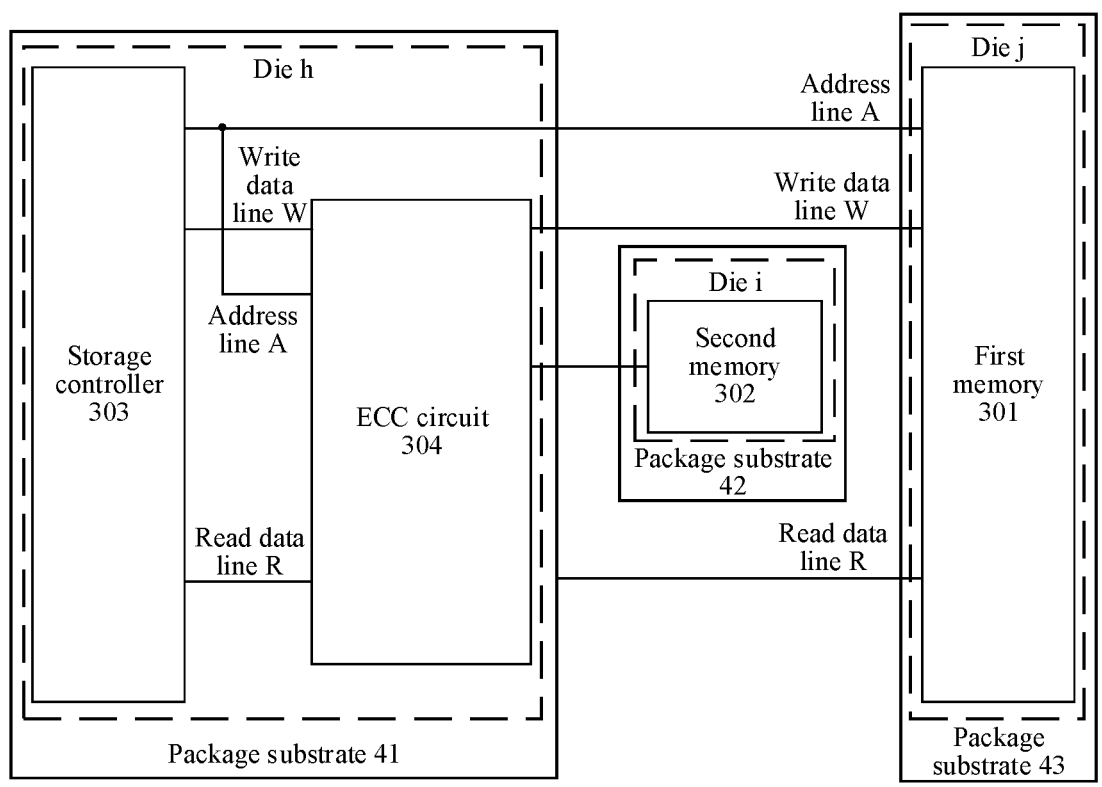
FIG. 13 is a schematic diagram of fourth packaging of a storage apparatus according to an embodiment.

Fourth manner: FIG. 13 is a schematic diagram of fourth packaging of a storage apparatus according to an embodiment of this disclosure. As shown in FIG. 13, a storage controller 303 and an ECC circuit 304 are integrated into a same die h (for example, a logic die or a basic die), and are mounted on a package substrate 41. A second memory 302 is integrated into a die i (for example, an SRAM die), and is mounted on a package substrate 42. A first memory 301 is integrated into a die j (for example, a DRAM die), and is mounted on a package substrate 43.

During actual application, the ECC circuit 304 may communicate with the second memory 302 through a high-speed interconnection interface such as serdes phy.

Figure 14:
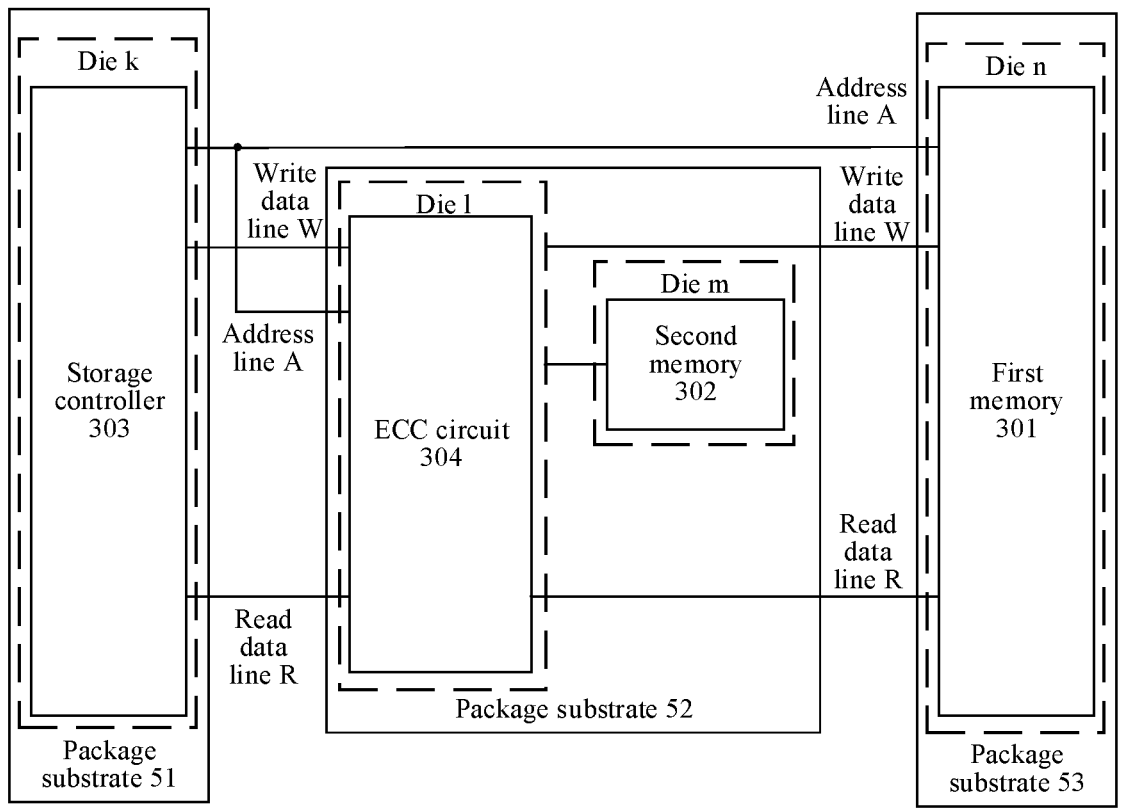
FIG. 14 is a schematic diagram of fifth packaging of a storage apparatus according to an embodiment.

Fifth manner: FIG. 14 is a schematic diagram of fifth packaging of a storage apparatus according to an embodiment of this disclosure. As shown in FIG. 14, a storage controller 303 is integrated into a die k (for example, a logic die or a basic die), and is mounted on a package substrate 51. The ECC circuit 304 and the second memory 302 are integrated into a die 1 and a die m, and are mounted on a package substrate 52. A first memory 301 is integrated into a die n (for example, a DRAM die), and is mounted on a package substrate 53.

During actual application, the ECC circuit 304 may communicate with the second memory 302 through a high-speed interconnection interface such as die-to-die phy.

Certainly, the storage apparatus may further have another package manner. This is not limited in this embodiment.

An embodiment of this disclosure further provides an error correction apparatus, including the ECC circuit and the second memory shown in FIG. 2 to FIG. 9.

It may be understood that in the error correction apparatus, the ECC circuit and the second memory may be packaged in a package manner shown in FIG. 14.

An embodiment of this disclosure further provides a storage control apparatus, including the storage controller and the ECC circuit shown in FIG. 2 to FIG. 9.

It may be understood that, in the storage control apparatus, the storage controller and the ECC circuit may be packaged in a package manner shown in FIG. 11 or FIG. 13.

An embodiment of this disclosure further provides a system on chip (SOC). The system on chip may include a processor, a bus, and the storage apparatus shown in FIG. 2 to FIG. 9. The processor and the storage apparatus are coupled to the bus.

The processor is configured to: output a write instruction and first data to the storage apparatus through the bus; or output a read instruction to the storage apparatus through the bus, and receive, through the bus, second data output by the storage apparatus.

The processor may be a general-purpose central processing unit (CPU), a microprocessor, an application-specific integrated circuit (ASIC), or the like.

An embodiment of this disclosure further provides an electronic device. The electronic device may be a computing device such as a server. Alternatively, the electronic device may be a storage device such as a storage array. Alternatively, the electronic device may be a network device such as a switch.

Figure 15:
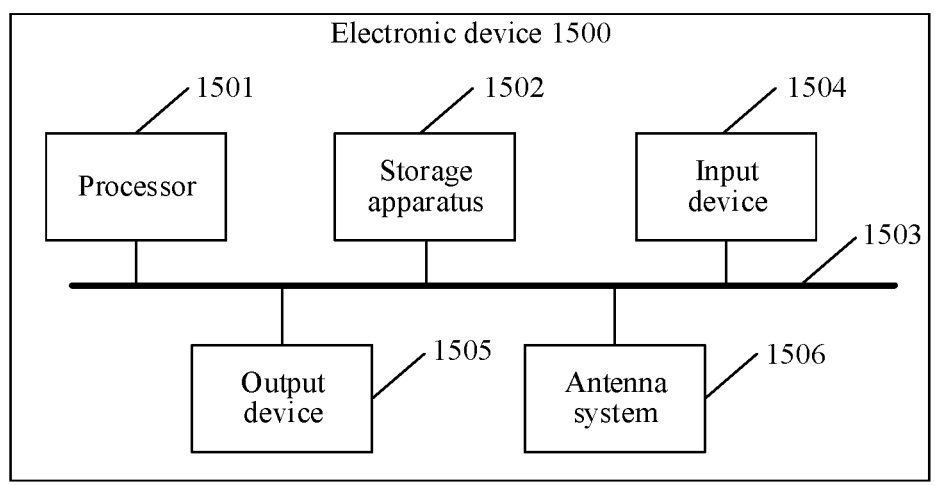
FIG. 15 is a schematic diagram of hardware of an electronic device according to an embodiment.

FIG. 15 is a schematic diagram of hardware of an electronic device according to an embodiment of this disclosure. As shown in FIG. 15, an electronic device 1500 may include a processor 1501, a storage apparatus 1502, a bus 1503, an input device 1504, an output device 1505, and an antenna system 1506.

In some possible implementations, the storage apparatus 1502 is consistent with the storage apparatus in one or more of the foregoing embodiments. Further, the processor 1501 may be consistent with the system on chip in the foregoing embodiment.

The storage apparatus 1502 may store program instructions, such as an operating system, an application, another program module, executable code, program data, and user data.

The input device 1504 may be configured to input a command and information to the electronic device 1500. The input device 1504 is a keyboard or a pointing device, such as a mouse, a trackball, a touchpad, a microphone, a joystick, a game pad, a satellite television antenna, a scanner, or a similar device. These input devices may be connected to the processor 1501 through the bus 1503.

The output device 1505 may be used by the electronic device 1500 to output information. In addition to a monitor, the output device 1505 may be another peripheral output device, for example, a speaker and/or a printing device. These output devices may also be connected to the processor 1501 through the bus 1503.

The antenna system 1506 receives and sends a wireless communication signal under control of the processor 1501, to implement wireless communication with a mobile communication network.

Certainly, the electronic device may further have another functional component. This is not limited in this embodiment.

An embodiment of this disclosure further provides a data storage method, which may be applied to the storage apparatus in one or more of the foregoing embodiments.

The method may include: A storage controller writes data into a first memory, and reads the data from the first memory. The first memory and a second memory are disposed in different dies, the second memory is configured to store an error correcting code corresponding to the data, and the error correcting code is used to perform data protection on the data.

In some possible implementations, the data includes first data and second data. That the storage controller writes data into a first memory includes: The storage controller writes the first data into the first memory.

That the storage controller reads the data from the first memory includes: The storage controller reads the second data from the first memory.

Correspondingly, the method further includes: An ECC circuit generates a first error correcting code corresponding to the first data; or the ECC circuit performs error correction on the second data based on a second error correcting code in the second memory, where the second error correcting code is an error correcting code corresponding to the second data.

In some possible implementations, that an ECC circuit generates a first error correcting code corresponding to the first data includes: When determining that the first data is data that needs to be protected, the ECC circuit generates the first error correcting code.

That the ECC circuit performs error correction on the second data based on a second error correcting code in the second memory includes: When determining that the second data is data that needs to be protected, the ECC circuit performs error correction on the second data based on the second error correcting code.

In some possible implementations, the method further includes: The ECC circuit determines, based on preset protection configuration information and a first address corresponding to the first data, whether the first data is data that needs to be protected; or the ECC circuit determines, based on the protection configuration information and a second address corresponding to the second data, whether the second data is data that needs to be protected. The protection configuration information includes a mapping relationship between an address of a zone in the first memory and an address of a zone in a second memory, and the zone in the second memory corresponds to data that needs to be protected.

In some possible implementations, that the storage controller writes first data into a first memory includes: The storage controller outputs the first address and the first data to the ECC circuit. The ECC circuit writes the first data into a first zone in the first memory based on the first address.

In some possible implementations, after the ECC circuit generates the first error correcting code, the method further includes: The ECC circuit obtains a third address corresponding to the first address, and writes the first error correcting code into a second zone in the second memory based on the third address.

In some possible implementations, the method further includes: When determining that the first data is data that does not need to be protected, the ECC circuit writes the first data into the first memory.

In some possible implementations, that the storage controller reads second data from the first memory includes: The storage controller outputs the second address to the ECC circuit. The ECC circuit reads the second data from a third zone in the first memory based on the second address. The ECC circuit outputs the second data to the storage controller.

In some possible implementations, that the ECC circuit outputs the second data to the storage controller includes: The ECC circuit checks the second data based on the second error correcting code; and if an error is detected, performs error correction on the second data, and outputs the error-corrected second data to the storage controller; or if no error is detected, outputs the second data to the storage controller.

In some possible implementations, when it is determined that the second data is data that needs to be protected, the method further includes: The ECC circuit obtains a fourth address corresponding to the second address; and reads the second error correcting code from a fourth zone in the second memory based on the fourth address.

In some possible implementations, the method further includes: When determining that the second data is data that does not need to be protected, the ECC circuit outputs the second data to the storage controller.

An embodiment of this disclosure further provides a data storage method, which may be applied to the storage control apparatus in one or more of the foregoing embodiments.

In this case, the method may include:

The storage control apparatus writes first data into a first memory, and reads second data from the first memory. When determining that the first data is data that needs to be protected, the storage control apparatus generates a first error correcting code. When determining that the second data is data that needs to be protected, the storage control apparatus performs error correction on the second data based on a second error correcting code.

In some possible implementations, the method further includes: The storage control apparatus determines, based on preset protection configuration information and a first address corresponding to the first data, whether the first data is data that needs to be protected; and the storage control apparatus determines, based on the protection configuration information and a second address corresponding to the second data, whether the second data is data that needs to be protected. The protection configuration information includes a mapping relationship between an address of a zone in the first memory and an address of a zone in a second memory, and the zone in the second memory corresponds to data that is to be protected.

In some possible implementations, that the storage control apparatus writes first data into a first memory includes: The storage control apparatus writes the first data into a first zone in the first memory based on the first address.

In some possible implementations, after the storage control apparatus generates the first error correcting code, the method further includes: The storage control apparatus obtains a third address corresponding to the first address, and writes the first error correcting code into a second zone in the second memory based on the third address.

In some possible implementations, the method further includes: When determining that the first data is data that does not need to be protected, the storage control apparatus writes the first data into the first memory.

In some possible implementations, that the storage control apparatus reads the second data from the first memory includes: The storage controller reads the second data from a third zone in the first memory based on the second address.

In some possible implementations, that the storage control apparatus reads the second data from the first memory includes: The storage control apparatus checks the second data based on the second error correcting code; and if an error is detected, the storage control apparatus performs error correction on the second data, and obtains the error-corrected second data; or if no error is detected, the storage control apparatus obtains the second data.

In some possible implementations, before the storage control apparatus performs error correction on the second data, the method further includes: When determining that the second data is data that needs to be protected, the storage control apparatus obtains a fourth address corresponding to the second address; and the storage control apparatus reads the second error correcting code from a fourth zone in the second memory based on the fourth address.

In some possible implementations, the method further includes: When determining that the second data is data that does not need to be protected, the storage control apparatus reads the second data.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded or executed on a computer, all or some of the processes or the functions according to embodiments of this disclosure are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), or a semiconductor medium. The semiconductor medium may be a solid-state drive (SSD).

The foregoing descriptions are merely example implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A storage apparatus, comprising:
    a first die comprising a first memory comprising a plurality of first memory zones, wherein the first memory is configured to store first data and second data;
    a second die comprising a second memory comprising a plurality of second memory zones, wherein the second memory is configured to store a second error correcting code corresponding to the second data, and wherein the second error correcting code is configured to be used on the second data stored in the plurality of first memory zones; and
    a storage controller configured to:
        write the first data and the second data into the plurality of first memory zones, wherein a low end address of each zone in the plurality of first memory zones is the same as a storage address of each second memory zone; and
        read the first data and the second data from the plurality of first memory zones.

2. The storage apparatus of claim 1, wherein the first data comprises preset protection configuration information, and wherein the storage apparatus further comprises an error checking and correcting (ECC) circuit configured to:
    generate a first error correcting code corresponding to the first data;

perform error correction on the first data based on the first error correcting code; and perform error correction on the second data based on the second error correcting code.

3. The storage apparatus of claim 2, wherein the ECC circuit is further configured to:

generate the first error correcting code when the first data comprises preset protection configuration information indicating first data that needs to be protected; and perform error correction on the second data based on the second error correcting code when the second data comprises preset protection configuration information indicating second data that needs to be protected.

4. The storage apparatus of claim 3, wherein the ECC circuit is further configured to:

determine, based on the preset protection configuration information and a first address corresponding to the first data, whether the first data needs to be protected, wherein the preset protection configuration information comprises a mapping relationship between an address of a zone in the plurality of first memory zones and an address of a zone in the second memory, and wherein the zone in the second memory corresponds to data that needs to be protected; and determine, based on the preset protection configuration information and a second address corresponding to the second data, whether the second data needs to be protected.

5. The storage apparatus of claim 4, wherein the storage controller is further configured to output the first address and the first data to the ECC circuit, and wherein the ECC circuit is further configured to write the first data into a first zone in the plurality of first memory zones based on the first address.

6. The storage apparatus of claim 4, wherein the ECC circuit is further configured to, when determining that the first data needs to be protected:

obtain a third address corresponding to the first address; and write the first error correcting code into a second zone in the second memory based on the third address.

7. The storage apparatus of claim 4, wherein the storage controller is further configured to output the second address to the ECC circuit, and wherein the ECC circuit is further configured to:

read the second data from a third zone in the plurality of first memory zones based on the second address; and output the second data to the storage controller.

8. The storage apparatus of claim 7, wherein the ECC circuit is further configured to:

check the second data for errors based on the second error correcting code;

when an error is detected, perform error correction on the second data and output error-corrected second data to the storage controller; and when no error is detected, output the second data to the storage controller.

9. The storage apparatus of claim 7, wherein the ECC circuit is further configured to:

obtain a fourth address corresponding to the second address; and read the second error correcting code from a fourth zone in the second memory based on the fourth address.

10. The storage apparatus of claim 3, wherein the ECC circuit is further configured to write the first data into the plurality of first memory zones when the first data does not need to be protected.

11. The storage apparatus of claim 3, wherein the ECC circuit is further configured to output the second data to the storage controller when the second data does not need to be protected.

12. The storage apparatus of claim 2, wherein the second die comprises the ECC circuit and the second memory.

13. A storage apparatus comprising:

a first die comprising a first memory comprising a plurality of first memory zones, wherein the first memory is configured to store first data and second data;

a second die comprising:

a second memory comprising a plurality of second memory zones, wherein the second memory is configured to store a second error correcting code corresponding to the second data, and wherein the second error correcting code is configured to be used on the second data stored in the plurality of first memory zones;

an error checking and correcting (ECC) circuit; and a storage controller configured to:

write the first data and the second data into the plurality of first memory zones; and read the first data and the second data from the plurality of first memory zones.

14. The storage apparatus of claim 13, wherein the first data comprises preset protection configuration information, and wherein the ECC circuit is configured to:

generate a first error correcting code corresponding to the first data;

perform error correction on the first data based on the first error correcting code; and perform error correction on the second data based on the second error correcting code.

15. A storage control apparatus, comprising:

a first die comprising a first memory comprising a plurality of first memory zones;

a second die comprising a second memory and an error checking and correcting (ECC) circuit;

a storage controller coupled to the first memory and the ECC circuit and configured to:

write first data into the plurality of first memory zones, wherein the first data comprises preset protection configuration information; and read second data from the plurality of first memory zones; and generate, when the first data needs to be protected, a first error correcting code configured to be used on the first data;

perform error correction on the first data based on the first error correcting code; and perform error correction on the second data based on a second error correcting code when the second data needs to be protected.

16. The storage control apparatus of claim 15, wherein the ECC circuit is configured to:

determine, based on preset protection configuration information and a first address corresponding to the first data, whether the first data needs to be protected; and determine, based on the preset protection configuration information and a second address corresponding to the second data, whether the second data needs to be protected, wherein the preset protection configuration information comprises a mapping relationship between an address of a zone in the plurality of first memory zones and an address of a zone in the second memory, and wherein the zone in the second memory corresponds to data that needs to be protected.

17. The storage control apparatus of claim 16, wherein the storage controller is configured to output the first address and the first data to the ECC circuit, and wherein the ECC circuit is further configured to write the first data into a first zone in the plurality of first memory zones based on the first address.

18. The storage control apparatus of claim 17, wherein the ECC circuit is further configured to, when the first data needs to be protected;
   obtain a third address corresponding to the first address; and
   write the first error correcting code into a second zone in the second memory based on the third address.

19. The storage control apparatus of claim 17, wherein the storage controller is further configured to output the second address to the ECC circuit and wherein the ECC circuit is further configured to:
   read the second data from a third zone in the plurality of first memory zones based on the second address; and
   output the second data to the storage controller.

20. The storage control apparatus of claim 15, wherein the ECC circuit is further configured to, when the first data does not need to be protected, write the first data into the plurality of first memory zones.

* * * * *